United States Patent
Obenshain

(10) Patent No.: US 7,032,539 B1
(45) Date of Patent: Apr. 25, 2006

(54) BI-MODAL SEED PORT WITH PIVOTING TROUGH

(75) Inventor: James Roberts Obenshain, Peebles, OH (US)

(73) Assignee: Cedar Works, LLC, Peebles, OH (US)

( * ) Notice: Subject to any disclaimer, the term of this patent is extended or adjusted under 35 U.S.C. 154(b) by 0 days.

(21) Appl. No.: 11/088,293

(22) Filed: Mar. 25, 2005

(51) Int. Cl.
*A01K 39/01* (2006.01)

(52) U.S. Cl. ..................... 119/52.2; 119/57.8

(58) Field of Classification Search ............. 119/52.2, 119/52.3, 52.4, 57.8, 57.9
See application file for complete search history.

(56) References Cited

U.S. PATENT DOCUMENTS

| | | | | |
|---|---|---|---|---|
| 4,974,547 A * | 12/1990 | Graham | | 119/52.2 |
| 5,022,346 A * | 6/1991 | Robertson | | 119/52.2 |
| 5,215,039 A * | 6/1993 | Bescherer | | 119/57.8 |
| 5,372,094 A * | 12/1994 | Zens | | 119/52.2 |
| 5,701,841 A * | 12/1997 | Fasino | | 119/52.2 |
| 5,881,675 A * | 3/1999 | Shaffer | | 119/430 |
| 6,408,788 B1 * | 6/2002 | Lieb et al. | | 119/52.2 |
| 6,863,024 B1 * | 3/2005 | Obenshain | | 119/57.8 |
| 2004/0231606 A1 * | 11/2004 | Nock | | 119/57.8 |

FOREIGN PATENT DOCUMENTS

CA 2101221 * 1/1995

\* cited by examiner

*Primary Examiner*—Peter M. Poon
*Assistant Examiner*—David Parsley
(74) *Attorney, Agent, or Firm*—Neal O. Willmann

(57) ABSTRACT

A seed port, specifically designed to permit dispensing large and small seeds from the same feeder, can be used with a bird feeder having a reservoir for the containment of bird seed, wherein the seed port has a platform with an opening that attaches to the reservoir and aligns with an opening in the reservoir. The seed port further provides a hinged trough that pivots within the opening of the seed port to alternatively offer a variety of seed sizes in the bowl of the trough or to permit access to only smaller seeds in the reservoir through an appropriately sized slot in the trough that becomes apparent only when the trough is pivoted to deny access to the bowl.

3 Claims, 2 Drawing Sheets

BI-MODAL SEED PORT WITH PIVOTING TROUGH

FIELD OF THE INVENTION

This disclosure relates to bird feeders, and more specifically, to a bird feeder featuring a particularly defined seed port that will permit versatility with regard to the types of seed that can be dispensed from a bird feeder equipped with a seed port having the features described herein. In a preferred embodiment, the disclosed seed port will have two modes: In one mode the port will dispense large seeds from a trough, and in another mode, the port will allow the feeder to provide relatively small seeds from the reservoir.

DESCRIPTION OF THE PRIOR ART

Seed ports attached to or integrated with bird feeders to control the flow or size of seed dispensed from the housing or storage reservoir of the feeder have been described in earlier patent documents. Representative of those patents and the various ports described therein are the following:

U.S. Pat. No. 4,414,922, which issued Nov. 15, 1983 to Hyde, describes an improved feeding port having an opening in the side of the storage compartment that is partially occluded by resilient finger members arranged to prevent the free flow of seeds, yet permit easy access and forcible extraction by feeding birds.

U.S. Pat. No. 4,977,859, which issued Dec. 18, 1990 to Kilham, describes a bird feeding device wherein the ports for dispensing birdseed can be maintained or diminished to vary the flow of seed to feeding birds.

U.S. Pat. No. 4,188,913, which issued Feb. 19, 1980, to Earl et al. describes a wild bird feeding device with separate compartments with dispensing units that can be variously aligned with holes or ports in the wall of the device to vary the flow of seed from the seed compartments to the dispensing unit.

U.S. Pat. No. 6,408,788, which issued Jun. 25, 2002, to Lieb et al. describes a seed port that will permit dispensing large and small seeds from the same feeder. The seed port features a trough with a hinged lid having a small opening, wherein the hinged lid of the port will either deny access to the seeds in the trough while permitting access to small seeds in the reservoir through the small opening in the lid, or deny access to seeds in the reservoir while permitting access to seeds of all sizes in the trough.

And, most recently, U.S. Pat. No. 6,863,024, which issued Mar. 8, 2005 to Obenshain, discloses a seed port having structural features, which in one mode, will permit access to any and all seeds within the seed reservoir, and in another mode provide access to only smaller seeds in the reservoir.

SUMMARY OF THE INVENTION

Essentially, what is described herein is a seed port for a bird feeder. The seed port is described as bi-modal because it allows the feeder to dispense seeds of at least two different sizes. Typically, the feeder will have a reservoir, ideally columnar, for the containment of seeds, and the reservoir has at least one opening in its side to provide access to the contained seeds. The seed port, which attaches to the reservoir, comprises: a platform, or escutcheon, having an opening that aligns with the/an opening in the wall of the reservoir; and a trough positioned within the opening in the platform. In one mode, the trough features a bowl to collect and dispense seeds falling naturally from within the reservoir. To facilitate transformation into the second mode, the trough is hinged to the platform of the seed port to allow the trough to pivot within the opening in the platform. By a pivoting movement, the trough can be transformed to permit or deny access to seeds in the bowl and when access to the seeds in the bowl is denied, access to smaller seeds within said reservoir is permitted through a slot appropriately sized to dispense small seeds. The slot is positioned in the pivoting trough, but it is apparent only when the trough has been pivoted to deny access to the bowl of the trough. The seed port will also preferably feature a canopy and perch to enhance both the appearance and functionality of the feeder.

DESCRIPTION OF THE PREFERRED EMBODIMENT

Figure 1:
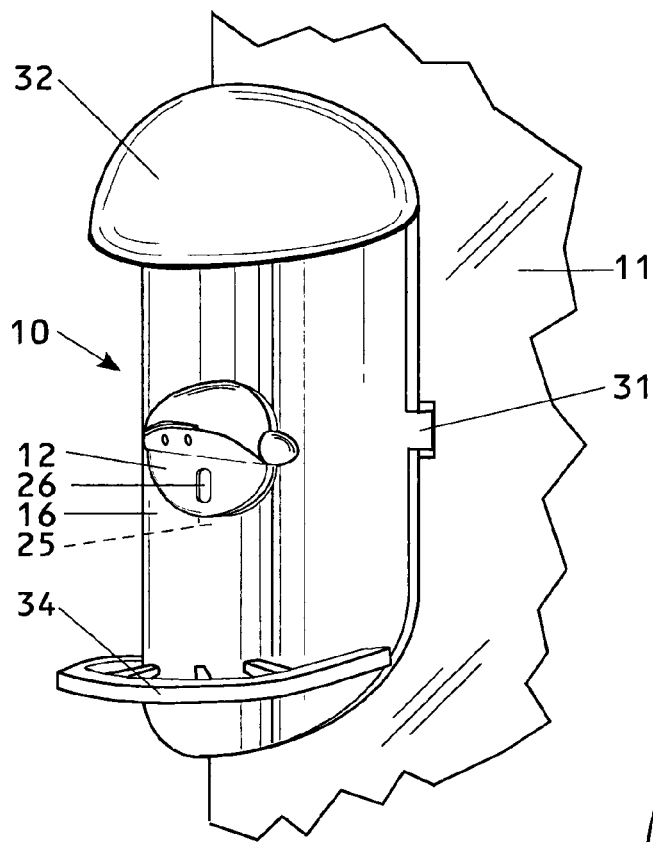
FIG. 1 is an elevated perspective view of the disclosed bi-modal seed port attached to a reservoir shown in partial section.

The disclosed seed port can best be described by referring to the drawing. The perspective view of FIG. 1 illustrates how the seed port 10 attaches to the seed reservoir 11. Typically, the seed port can be made secure in its attachment to the reservoir with the use of tabs 31 clearly depicted in all five views of the drawing. The tabs 31, attached to the escutcheon 16 of the seed port, slip easily into mating slots in the reservoir 11 and effect a secure friction fit holding the seed port firmly to the reservoir.

The seed reservoir 11 is typically constructed from a clear plastic material and can be either hung from an overhead hanging or cantilevered structure or supported by a pole or pedestal. Frequently, but not necessarily, the reservoir will rest on a base plate (not shown) to catch and collect seed spilled or dropped form the seed port 10 in the normal course of events.

Completing the description of the seed port 10 depicted in FIG. 1, the pivoting trough 12 of the seed port 10 is readily apparent, and in this instance, or depiction, the trough 12 is in the small seed mode. As described above, the pivoting trough 12 enables the seed port 10 to be bi-modal by permitting the dispensing of a variety of seed types and sizes, including large seeds, when the trough 12 is in one mode and only smaller seeds when the trough 12 is in another mode.

It is apparent that the seed port is in the smaller seed mode in FIG. 1 because small seed slot 26 is evident. Small seed slot 26 is only evident when the pivoting trough 12 pivots on its hinge or axles 18 to expose the small seed slot 26. When the trough is in the large seed mode (FIGS. 2 and 5, the small seed slot 26 is positioned within the reservoir and unavailable to dispense small seeds.

Depicted in phantom in FIG. 1 is a small detent 25. The detent is positioned on the lower, inner surface of the pivoting trough 12. When the trough is in the small seed mode, the detent 25 will catch the lower edge of seed port opening 14 to assist in holding or maintaining the trough in the small seed mode.

Figure 2:
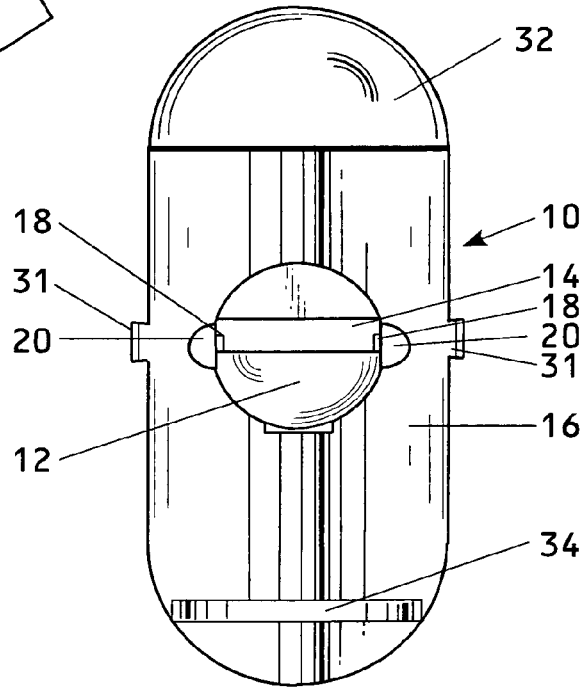
FIG. 2 is an elevated front view of the seed port in a mode for dispensing either large or small seeds.

The seed port 10 is depicted apart from the reservoir in FIGS. 2, 3, 4 and 5. In FIG. 2 the pivoting trough 12 is in the large seed mode. In this mode, the trough 12 pivots "down" from the small seed mode to provide a bowl 22 (FIG. 5) for the collection of any and all (including large) seeds from the reservoir. In the large seed mode, the seeds in the reservoir drop freely through the opening 14 in the reservoir that coincides with the opening in the seed port and into the bowl 22 of the trough 12. The pivoting down is easily effected by exerting gentle downward force on stop 24 (FIG. 4) and allowing the trough 12 to pivot on axles 18 which are attached to both sides of the trough and extend into a pair of axle hubs 20 positioned diametrically on either side of the opening in the seed port 14. The hubs 20 hold the axles 18 securely and permit the attached trough 12 to pivot between the large and smaller seed modes. The stop 24 is so named because it "stops" the downward pivoting movement of the trough 12 by encountering the outer, lower edge of the opening 14 in the escutcheon 16 of the seed port 10 to prevent further pivoting and maintain, to some extent, the proper orientation for large seed feeding from the trough 12.

Figure 3:
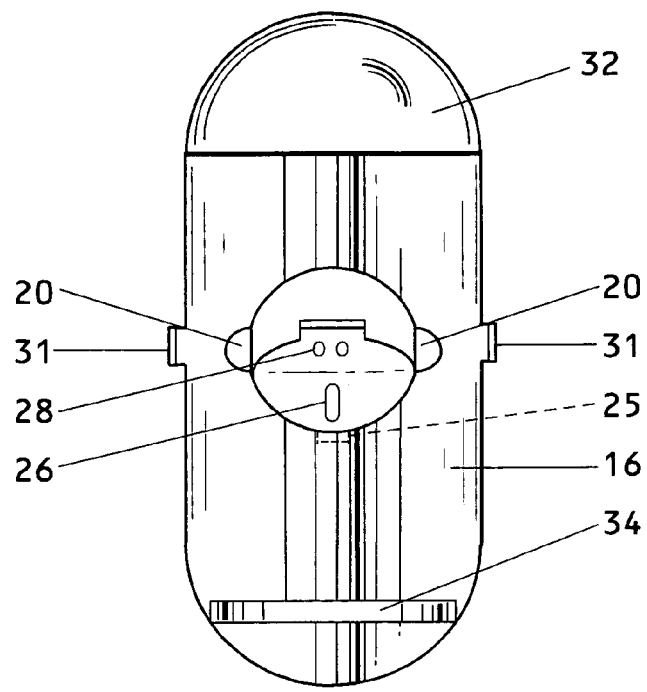
FIG. 3 is an elevated front view of the seed port in a mode for dispensing only smaller seeds.

In FIG. 3, the pivoting trough 12 is in the smaller seed mode, and it is apparent that there is no access to seed in the reservoir except through small seed slot 26. Also apparent from FIG. 3 are drain holes 28, which are not functional in the small seed mode. The holes 28 are functionally positioned through the bottom of the bowl 22 of the trough 12 when it is in the large seed mode. In the large seed mode, the bowl is apt to collect water, and the holes permit the natural drainage of any water collected.

Figure 4:
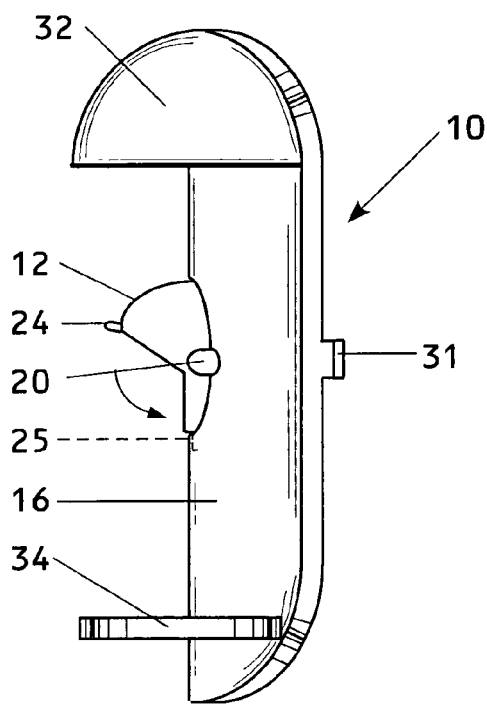
FIG. 4 is an elevated side view of the seed port in the same mode as FIG. 3; and, FIG. 5 is an elevated side view of the seed port in the same mode as FIG. 2, i.e., for dispensing either large or small seeds.
Figure 5:
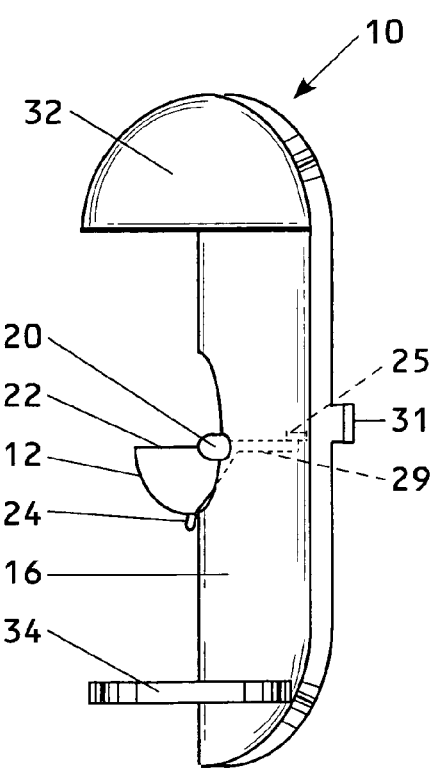

FIG. 4 illustrates how easy it is to reposition the pivoting trough 12 from one mode to the other. The arrow in FIG. 4 illustrates the downward pivot of the trough 12 that transforms the seed port from a small seed port (FIG. 4) to a larger seed port (FIG. 5). FIG. 5 also illustrates how the inner lip 29 of the trough 12, which provides the small seed slot 26, retreats into the reservoir (phantom depiction) when the trough is in the large seed mode.

Heretofore unmentioned but apparent in all views is a canopy 32, which, of course, will provide a measure of protection from the elements for the trough and the feeding birds, as well as improve the appearance of the seed port 10. Also apparent is perch 34, which, of course, will facilitate feeding from the trough, in either mode.

While the foregoing is a detailed and complete description of the preferred embodiment of the disclosed seed port, it should be apparent that numerous variations and modifications can be made and employed to implement the all important purpose of the seed port without departing from the spirit of the invention, which is fairly defined by the appended claims.

The invention claimed is:

1. A bi-modal seed port for a bird feeder, said feeder having a reservoir for the containment of seeds, said reservoir having at least one opening in its side to provide access to the contained seeds, and wherein said seed port comprises:

a platform attachable to said reservoir and having an opening in alignment with an opening in the wall of said reservoir; and, a trough, of unitary one-piece construction, positioned within said opening in said platform and having a bowl to collect and dispense seeds falling naturally from within said reservoir, said trough hinged to said platform to allow said trough to pivot within said opening in said platform, said trough pivoting to permit or deny access to seeds in said bowl and when access to said seeds in said bowl is denied, access to smaller seeds within said reservoir is permitted through a slot, appropriately sized to dispense small seeds, said slot positioned in the bottom of said pivoting trough and apparent only when said trough has been pivoted to deny access to the bowl of said trough.

2. The bi-modal seed port according to claim 1 wherein the platform supports a perch to facilitate access to said trough.

3. The bi-modal seed port according to claim 1 wherein the platform supports a canopy to shield said trough.

* * * * *